(12) United States Patent
Yaguchi et al.

(10) Patent No.: US 9,216,726 B2
(45) Date of Patent: Dec. 22, 2015

(54) VEHICLE AND CONTROL METHOD FOR VEHICLE

(75) Inventors: Hideaki Yaguchi, Toyota (JP); Takeshi Hoshiba, Anjo (JP); Akihiro Kimura, Toyota (JP); Masahiro Naito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 13/978,975

(22) PCT Filed: Jan. 27, 2011

(86) PCT No.: PCT/JP2011/051582
§ 371 (c)(1),
(2), (4) Date: Jul. 10, 2013

(87) PCT Pub. No.: WO2012/101802
PCT Pub. Date: Aug. 2, 2012

(65) Prior Publication Data
US 2013/0297132 A1    Nov. 7, 2013

(51) Int. Cl.
| B60L 11/00 | (2006.01) |
| B60W 10/08 | (2006.01) |
| B60K 6/445 | (2007.10) |
| B60W 10/06 | (2006.01) |
| B60W 20/00 | (2006.01) |
| B60W 10/10 | (2012.01) |
| B60W 10/184 | (2012.01) |

(52) U.S. Cl.
CPC ............... *B60W 10/08* (2013.01); *B60K 6/445* (2013.01); *B60W 10/06* (2013.01); *B60W 10/10* (2013.01); *B60W 10/184* (2013.01); *B60W 20/00* (2013.01); *B60W 2540/06* (2013.01); *Y02T 10/6239* (2013.01); *Y10S 903/93* (2013.01)

(58) Field of Classification Search
None
See application file for complete search history.

(56) References Cited

U.S. PATENT DOCUMENTS

| 6,020,696 A | 2/2000 | Matsunaga et al. |
| 6,488,107 B1 | 12/2002 | Ochiai et al. |
| 8,192,327 B2 * | 6/2012 | Gibson et al. ............ 477/77 |
| 2001/0027370 A1 | 10/2001 | Tamura et al. |
| 2003/0019286 A1 | 1/2003 | Wakahara et al. |
| 2005/0055152 A1 | 3/2005 | Wakashiro et al. |
| 2005/0209044 A1 | 9/2005 | Imazu et al. |

(Continued)

FOREIGN PATENT DOCUMENTS

| DE | 102008042409 A1 | 4/2009 |
| DE | 112008001444 T5 | 4/2010 |

(Continued)

OTHER PUBLICATIONS

Jan. 13, 2015 Office Action issued in U.S. Appl. No. 13/978,762.
(Continued)

*Primary Examiner* — Thomas Tarcza
*Assistant Examiner* — Garrett Evans
(74) *Attorney, Agent, or Firm* — Oliff PLC

(57) ABSTRACT

An ECU executes a program including the steps of: executing fuel-cut control when an IG OFF operation has been performed and when a vehicle is traveling; executing deceleration control when vehicle speed is equal to or higher than a threshold value; ending the deceleration control and permitting restart of an engine when the vehicle speed has become lower than the threshold value; and controlling a first MG and the engine when an IG ON operation has been performed.

8 Claims, 5 Drawing Sheets

(56) References Cited

U.S. PATENT DOCUMENTS

| | | | |
|---|---|---|---|
| 2008/0098246 A1 | 4/2008 | Kim | |
| 2008/0109142 A1 | 5/2008 | Endo | |
| 2008/0275625 A1 | 11/2008 | Snyder | |
| 2009/0088291 A1 | 4/2009 | Kumazaki et al. | |
| 2009/0120701 A1 | 5/2009 | Taguchi et al. | |
| 2009/0299559 A1 | 12/2009 | Shimohira et al. | |
| 2010/0244886 A1 | 9/2010 | Kawahara et al. | |
| 2010/0262322 A1 | 10/2010 | Yokouchi et al. | |
| 2011/0263379 A1* | 10/2011 | Liang et al. | 477/5 |
| 2011/0314316 A1 | 12/2011 | Kim | |
| 2012/0162693 A1 | 6/2012 | Ito | |
| 2013/0253749 A1 | 9/2013 | Hayashi et al. | |
| 2013/0261866 A1 | 10/2013 | Hoshiba | |
| 2013/0297130 A1 | 11/2013 | Yaguchi et al. | |
| 2013/0297131 A1 | 11/2013 | Yaguchi et al. | |

FOREIGN PATENT DOCUMENTS

| | | |
|---|---|---|
| EP | 2657097 A1 | 10/2013 |
| JP | A-10-174212 | 6/1998 |
| JP | A-10-257604 | 9/1998 |
| JP | A-2000-257460 | 9/2000 |
| JP | 2001-065385 A | 3/2001 |
| JP | A-2004-092623 | 3/2004 |
| JP | 2005-261041 A | 9/2005 |
| JP | A-2005-233252 | 9/2005 |
| JP | A-2007-023919 | 2/2007 |
| JP | A-2007-216833 | 8/2007 |
| JP | A-2007-263020 | 10/2007 |
| JP | 2008-190495 A | 8/2008 |
| JP | 2009-149116 A | 7/2009 |
| JP | 2009-280176 A | 12/2009 |

OTHER PUBLICATIONS

Jul. 17, 2014 Office Action issued in U.S. Appl. No. 13/976,592.
Oct. 22, 2014 Office Action issued in U.S. Appl. No. 13/976,592.
Feb. 2, 2015 Advisory Action issued in U.S. Appl. No. 13/976,592.
May 7, 2015 Office Action issued in U.S. Appl. No. 13/978,762.
Sep. 25, 2015 Notice of Allowance issued in U.S. Appl. No. 13/978,762.

* cited by examiner

VEHICLE AND CONTROL METHOD FOR VEHICLE

TECHNICAL FIELD

The present invention relates to control of a vehicle having a rotating electric machine and an internal combustion engine.

BACKGROUND ART

Japanese Patent Laying-Open No. 2007-23919 (PTL 1) discloses an engine start control system disclosing a technique of restarting an engine when a push switch is pushed even if a brake pedal is not depressed if the engine has stopped due to some cause while a vehicle is traveling.

In addition, in recent years, as one of the countermeasures against environmental problems, hybrid vehicles equipped with a motor generator and an engine have received attention.

CITATION LIST

Patent Literature

PTL 1: Japanese Patent Laying-Open No. 2007-23919

SUMMARY OF INVENTION

Technical Problem

In the hybrid vehicle as described above, if the engine has stopped due to some cause while the vehicle is traveling at high speed, the engine cannot in some cases be restarted immediately. This is because when the engine is started using a motor generator while the vehicle is traveling, power generation or discharge of the motor generator may occur in some cases. When allowable input/output power is restricted in accordance with a state of a power storage device, the operation of the motor generator involving power generation or discharge is restricted. Therefore, the engine cannot sometimes be restarted immediately.

With the engine start control system disclosed in the above-described publication, such a problem is not considered at all, and thus cannot be solved.

An object of the present invention is to provide a vehicle and a control method for a vehicle wherein an engine is controlled to be in a restartable state upon reception of a stop command for the engine during traveling at high speed.

Solution to Problem

A vehicle according to an aspect of the present invention includes: a drive wheel; an internal combustion engine; a first rotating electric machine (20) for starting the internal combustion engine; a power transmission device coupled between the first rotating electric machine and the drive wheel; an input unit for receiving, from a driver, either a stop command or a start command for a system of a vehicle; and a control unit for controlling the vehicle in accordance with a command from the input unit. When the stop command has been received at the input unit while the vehicle is traveling, the control unit prohibits restart of the internal combustion engine while speed of the vehicle is higher than a threshold value, and permits restart of the internal combustion engine after the speed of the vehicle becomes lower than the threshold value.

Preferably, the vehicle further includes: a power storage device for transmitting and receiving power to and from the first rotating electric machine. The first rotating electric machine generates power when the internal combustion engine in a stop state is started while the vehicle is traveling.

Further preferably, the vehicle further includes: a braking device for restricting rotation of the drive wheel using frictional force. When the stop command has been received at the input unit while the vehicle is traveling, the control unit controls the braking device to reduce the speed of the vehicle using the frictional force.

Further preferably, the power transmission device includes an automatic transmission. When the stop command has been received at the input unit while the vehicle is traveling, the control unit controls the automatic transmission to reduce the speed of the vehicle by increasing a gear ratio of the automatic transmission.

Further preferably, the vehicle further includes: a second rotating electric machine for restricting rotation of the drive wheel using motor torque. When the stop command has been received at the input unit while the vehicle is traveling, the control unit controls the second rotating electric machine to reduce the speed of the vehicle using the motor torque.

Further preferably, the vehicle further includes: a drive shaft for rotating the drive wheel. The power transmission device mechanically couples three elements, which are the drive shaft, an output shaft of the internal combustion engine, and a rotation shaft of the first rotating electric machine, and utilizes any one of the three elements as a reaction force element, thereby allowing for transmission of motive power between the other two elements.

Further preferably, the power transmission device includes a clutch for switching a state of the first rotating electric machine and the drive wheel between a power transmission state and a power interruption state.

A control method for a vehicle according to another aspect of the present invention is a control method for a vehicle used in a vehicle including a drive wheel, an internal combustion engine, a first rotating electric machine for starting the internal combustion engine, and a power transmission device coupled between the first rotating electric machine and the drive wheel. The control method for a vehicle includes the steps of: determining whether either a stop command or a start command for a system of the vehicle has been received from a driver or not; and when the stop command has been received while the vehicle is traveling, prohibiting restart of the internal combustion engine while speed of the vehicle is higher than a threshold value, and permitting restart of the internal combustion engine after the speed of the vehicle becomes lower than the threshold value.

Advantageous Effects of Invention

According to the present invention, when the stop command has been received while the vehicle is traveling, restart of the internal combustion engine is prohibited while the vehicle speed is higher than the threshold value. As a result, power generation by the first rotating electric machine when the internal combustion engine is started can be suppressed. In addition, restart of the internal combustion engine is permitted after the vehicle speed becomes lower than the threshold value. As a result, an amount of increase in rotational speed of the first rotating electric machine when increasing the rotational speed of the internal combustion engine at the time of restart of the internal combustion engine can be made smaller than that when the vehicle speed does not become lower. Therefore, an amount of power generated by the first rotating electric machine at the time of restart of the internal combustion engine can be made smaller than that when the vehicle speed does not become lower. In other words, the first rotating electric machine can be operated within the range of the allowable input power in the power storage device. Consequently, the internal combustion engine can be restarted immediately. Thus, there can be provided a vehicle and a control method for a vehicle wherein an engine is controlled to be in a restartable state when a stop command for the engine has been received during high-speed traveling.

DESCRIPTION OF EMBODIMENTS

Embodiments of the present invention will be described hereinafter, with reference to the drawings. In the following description, the same components are denoted by the same symbols. The names and functions thereof are also the same. Accordingly, detailed description thereof will not be repeated.

Figure 1:
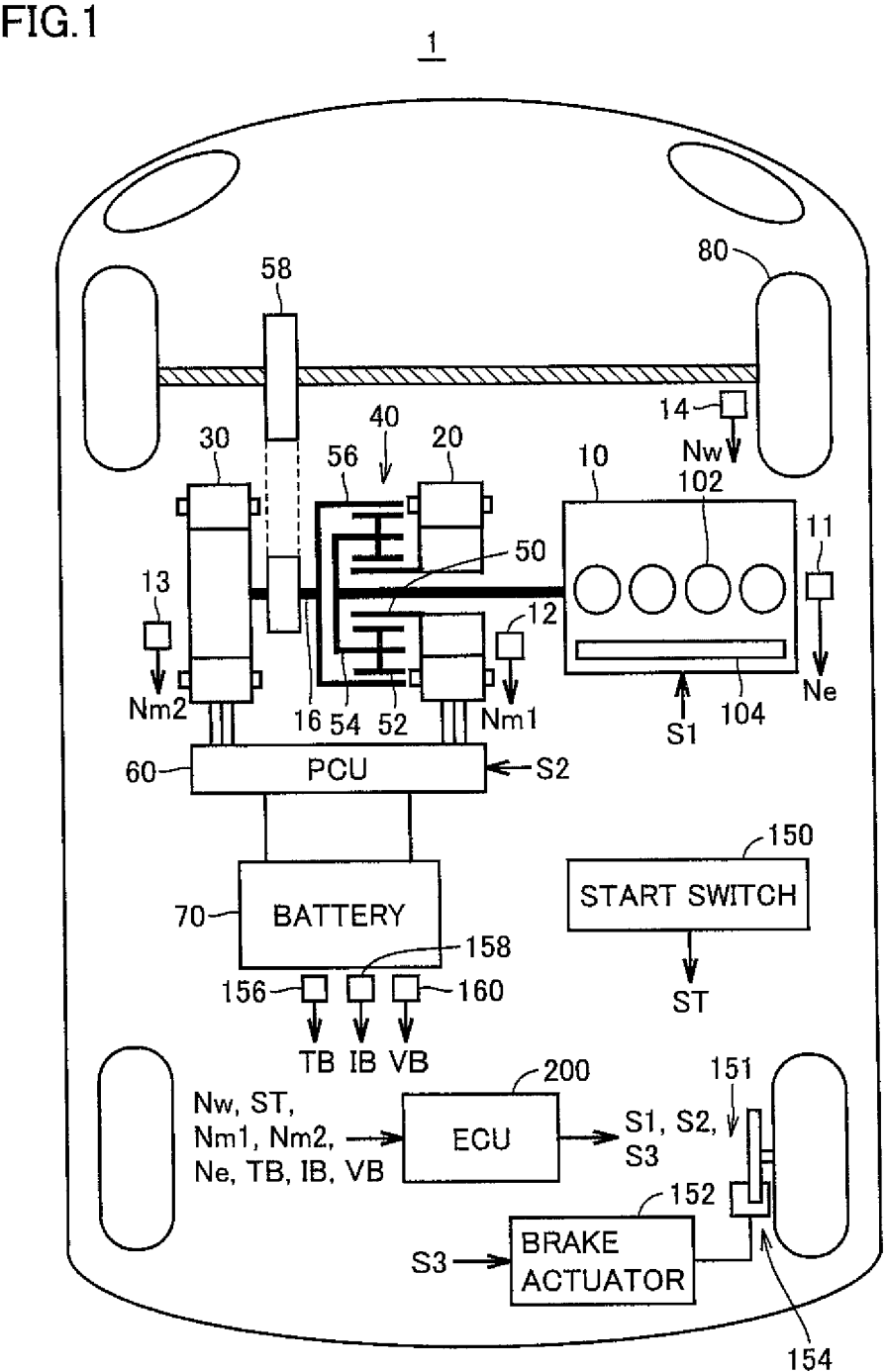
FIG. 1 is an overall block diagram of a vehicle according to the present embodiment.

Referring to FIG. 1, an overall block diagram of a vehicle 1 according to the present embodiment will be described. Vehicle 1 includes an engine 10, a drive shaft 16, a first motor generator (hereinafter referred to as first MG) 20, a second motor generator (hereinafter referred to as second MG) 30, a power split device 40, a speed reducer 58, a PCU (Power Control Unit) 60, a battery 70, drive wheels 80, a start switch 150, and an ECU (Electronic Control Unit) 200.

Vehicle 1 travels with driving force output from at least one of engine 10 and second MG 30. Motive power generated by engine 10 is split for two paths by power split device 40. Of the two paths, one is a path for transmission via speed reducer 58 to drive wheels 80, and the other is a path for transmission to first MG 20.

First MG 20 and second MG 30 are, for example, three-phase AC rotating electric machines. First MG 20 and second MG 30 are driven by PCU 60.

First MG 20 has a function as a generator which generates power using motive power of engine 10 split by power split device 40, to charge battery 70 via PCU 60. In addition, receiving power from battery 70, first MG 20 rotates a crankshaft of engine 10 which serves as an output shaft. First MG 20 thereby has a function as a starter which starts engine 10.

Second MG 30 has a function as a drive motor which provides driving force for drive wheels 80 using at least any one of power stored in battery 70 and power generated by first MG 20. In addition, second MG 30 has a function as a generator for charging battery 70 via PCU 60 with the use of power generated through regenerative braking.

Engine 10 is, for example, an internal combustion engine such as a gasoline engine and a diesel engine. Engine 10 includes a plurality of cylinders 102 and a fuel injection device 104 which supplies fuel to each of the plurality of cylinders 102. Based on a control signal S1 from ECU 200, fuel injection device 104 injects an appropriate amount of fuel for each cylinder with appropriate timing and stops injecting fuel for each cylinder.

For the detection of the rotational speed of the crankshaft of engine 10 (hereinafter referred to as engine rotational speed) Ne, engine 10 is further provided with an engine rotational speed sensor 11. Engine rotational speed sensor 11 transmits a signal indicating detected engine rotational speed Ne to ECU 200.

Power split device 40 mechanically couples together three elements for rotating drive wheels 80: drive shaft 16, the output shaft of engine 10, and a rotation shaft of first MG 20. Power split device 40 utilizes any one of the above-indicated three elements as a reaction force element, thereby allowing for the transfer of motive power between the other two elements. A rotation shaft of second MG 30 is coupled to drive shaft 16.

Power split device 40 is a planetary gear mechanism including a sun gear 50, pinion gears 52, a carrier 54, and a ring gear 56. Pinion gear 52 engages with each of sun gear 50 and ring gear 56. Carrier 54 supports pinion gears 52 in a manner to allow them to rotate, and is coupled to a crankshaft of engine 10. Sun gear 50 is coupled to the rotation shaft of first MG 20. Ring gear 56 is coupled via drive shaft 16 to the rotation shaft of second MG 30 and speed reducer 58.

Speed reducer 58 transfers motive power from power split device 40 and second MG 30 to drive wheels 80. In addition, speed reducer 58 transfers reaction force received by drive wheels 80 from a road surface, to power split device 40 and second MG 30.

PCU 60 converts DC power stored in battery 70 into AC power for driving first MG 20 and second MG 30. PCU 60 includes a converter and an inverter (both not shown) which are controlled based on a control signal S2 from ECU 200. The converter boosts a voltage of DC power received from battery 70 and outputs the boosted power to the inverter. The inverter converts the DC power output from the converter into AC power for output to first MG 20 and/or second MG 30. First MG 20 and/or second MG 30 are thus driven by using the power stored in battery 70. In addition, the inverter converts AC power generated by first MG 20 and/or second MG 30 into DC power and outputs it to the converter. The converter steps down a voltage of the DC power output by the inverter and outputs the stepped down power to battery 70. Battery 70 is thereby charged with the use of the power generated by first MG 20 and/or second MG 30. It is noted that the converter may be omitted.

Battery 70 is a power storage device and a rechargeable DC power supply. As battery 70, for example, a secondary battery such as a nickel-metal hydride secondary battery and a lithium ion secondary battery is used. Battery 70 has a voltage of the order of 200 V, for example. Battery 70 may be charged, other than with the use of the power generated by first MG 20 and/or second MG 30 as described above, with the use of power supplied from an external power supply (not shown). It is noted that battery 70 is not limited to a secondary battery, and may be anything that can generate a DC voltage, such as a capacitor, a solar cell, and a fuel cell, for example.

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push switch. Start switch 150 may be one that allows a key to be inserted into a key cylinder and rotated to a prescribed position. Start switch 150 is connected to ECU 200. In response to an operation of start switch 150 by a driver, start switch 150 transmits a signal ST to ECU 200.

ECU 200 determines that a start command has been received when, for example, signal ST has been received while the system of vehicle 1 is in a stop state, and then ECU 200 shifts the system of vehicle 1 from the stop state to a startup state. In addition, ECU 200 determines that a stop command has been received when signal ST has been received while the system of vehicle 1 is in the startup state, and then ECU 200 shifts the system of vehicle 1 from the startup state to the stop state. In the following descriptions, operation of start switch 150 by the driver when the system of vehicle 1 is in the startup state will be referred to as an IG OFF operation, and operation of start switch 150 by the driver when the system of vehicle 1 is in the stop state will be referred to as an IG ON operation. Once the system of vehicle 1 shifts to the startup state, for example, a plurality of pieces of equipment necessary for vehicle 1 to travel are supplied with power, and then enter an operable state. In contrast, once the system of vehicle 1 shifts to the stop state, for example, part of the plurality of pieces of equipment necessary for vehicle 1 to travel are no longer supplied with power, and then enter an operation stop state.

A first resolver 12 detects rotational speed Nm1 of first MG 20. First resolver 12 transmits a signal indicating detected rotational speed Nm1 to ECU 200. A second resolver 13 detects rotational speed Nm2 of second MG 30. Second resolver 13 transmits a signal indicating detected rotational speed Nm2 to ECU 200.

A wheel speed sensor 14 detects rotational speed Nw of drive wheels 80. Wheel speed sensor 14 transmits a signal indicating detected rotational speed Nw to ECU 200. ECU 200 calculates speed (hereinafter also referred to as vehicle speed) V of vehicle 1 based on rotational speed Nw received. It is noted that ECU 200 may calculate vehicle speed V based on rotational speed Nm2 of second MG 30 instead of rotational speed Nw.

A braking device 151 includes a brake actuator 152 and a disc brake 154. Disc brake 154 includes a brake disc rotating integrally with the wheels and a brake caliper restricting the rotation of the brake disc with the use of hydraulic pressure. The brake caliper includes brake pads provided to sandwich the brake disc in the direction parallel to a rotation shaft, and a wheel cylinder for transmitting the hydraulic pressure to the brake pads. Using frictional force generated between the brake disc and the brake pads due to an increase in the hydraulic pressure, disc brake 154 restricts the rotation of the brake disc (wheels).

Based on a control signal S3 received from ECU 200, brake actuator 152 adjusts hydraulic pressure generated due to depression of a brake pedal by the driver and hydraulic pressure generated using a pump, an electromagnetic valve and the like, and thereby adjusts hydraulic pressure to be supplied to the wheel cylinder. Although braking device 151 is illustrated only on the right side of the rear wheels in FIG. 1, braking device 151 is provided for each wheel.

ECU 200 generates control signal S1 for controlling engine 10 and outputs generated control signal S1 to engine 10. Further, ECU 200 generates control signal S2 for controlling PCU 60 and outputs generated control signal S2 to PCU 60. Furthermore, ECU 200 generates control signal S3 for controlling brake actuator 152 and outputs generated control signal S3 to brake actuator 152.

By controlling engine 10, PCU 60, and the like, ECU 200 controls the entire hybrid system, that is, a state of charging/discharging of battery 70 and states of operation of engine 10, first MG 20 and second MG 30 such that vehicle 1 can travel most efficiently.

ECU 200 calculates requested driving force which corresponds to an amount of depression of an accelerator pedal (not shown) provided at a driver's seat. ECU 200 controls torque of first MG 20 and second MG 30, and an output of engine 10, in accordance with the calculated requested driving force.

Vehicle 1 having a configuration as described above travels solely on second MG 30 when engine 10 is inefficient at the start of traveling or during low-speed traveling. In addition, during normal traveling, for example, power split device 40 divides motive power of engine 10 into two paths of motive power. Motive power in one path directly drives drive wheels 80. Motive power in the other path drives first MG 20 to generate power. At this time, ECU 200 uses generated power to drive second MG 30. In this way, by driving second MG 30, assistance in driving drive wheels 80 is provided.

When vehicle 1 reduces its speed, regenerative braking is performed with second MG 30, which follows the rotation of drive wheels 80, functioning as a generator. The power recovered through regenerative braking is stored in battery 70. It is noted that when remaining capacitance (hereinafter referred to as SOC (State of Charge)) of the power storage device has lowered and is particularly in need of charging, ECU 200 increases an output of engine 10 to increase an amount of power generated by first MG 20. The SOC of battery 70 is thereby increased. In addition, even during low-speed traveling, ECU 200 may exert control for increasing driving force from engine 10 as necessary, for example, such as when battery 70 is in need of charging as described above, when auxiliary machinery such as an air conditioner is to be driven, and when the temperature of cooling water for engine 10 is to be raised to a prescribed temperature.

In controlling amounts of charging and discharging of battery 70, ECU 200 sets, based on battery temperature TB and the current SOC, allowable input power in charging battery 70 (hereinafter referred to as "charge power upper limit value Win") and allowable output power in discharging battery 70 (hereinafter referred to as "discharge power upper limit value Wout"). For instance, as the current SOC gets lower, discharge power upper limit value Wout is gradually set lower. In contrast, as the current SOC gets higher, charge power upper limit value Win is gradually set lower.

In addition, the secondary battery used as battery 70 has temperature dependence that causes an increase in internal resistance at low temperatures. In addition, at high temperatures, it is necessary to prevent an overincrease in temperature caused by further heat generation. It is therefore preferable to lower each of discharge power upper limit value Wout and charge power upper limit value Win when battery temperature TB is low and when battery temperature TB is high. ECU 200 sets charge power upper limit value Win and discharge power upper limit value Wout in accordance with battery temperature TB and the current SOC, for example, through the use of a map or the like.

In vehicle 1 having the configuration described above, if engine 10 has stopped due to some cause during high-speed traveling, the engine cannot in some cases be restarted immediately. It is assumed that vehicle 1 is traveling at high speed, as indicated by the solid line shown in the nomographic chart of FIG. 2, for example.

Figure 2:
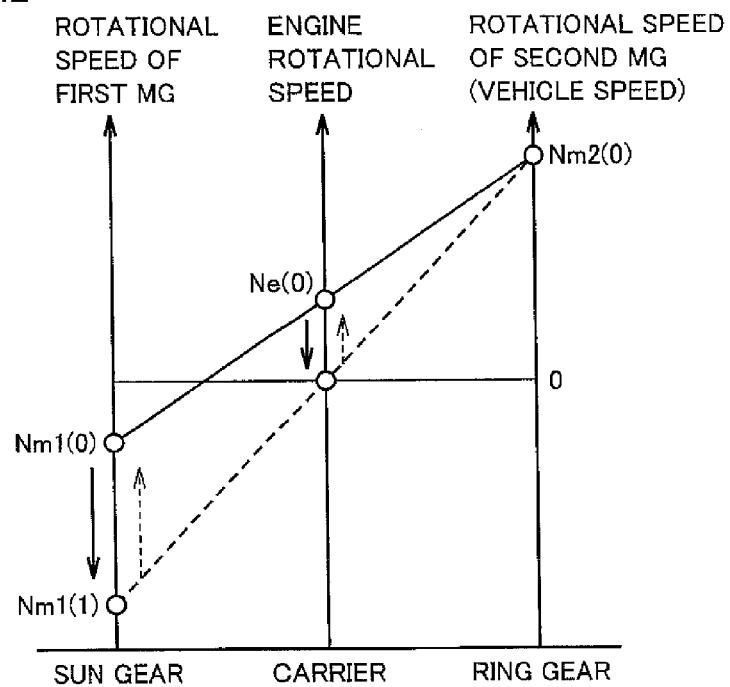
FIG. 2 is a (first) nomographic chart for illustrating operation of the vehicle in the present embodiment.

Of the three vertical axes of the nomographic chart shown in FIG. 2, the left vertical axis indicates the rotational speed of sun gear 50, that is, rotational speed Nm1 of first MG 20. The center vertical axis of the nomographic chart shown in FIG. 2 indicates the rotational speed of carrier 54, that is, engine rotational speed Ne. The right vertical axis of the nomographic chart shown in FIG. 2 indicates the rotational speed of ring gear 56, that is, rotational speed Nm2 of second MG 30. It is noted that the direction of an arrow formed by each vertical axis of the nomographic chart of FIG. 2 indicates a positive rotational direction, and a direction opposite to the direction of the arrow indicates a negative rotational direction.

While vehicle 1 is traveling, rotational speed Nm1 of first MG 20, engine rotational speed Ne, and rotational speed Nm2 of second MG 30 vary in such a manner that rotational speeds Nm1, Ne and Nm2 of these elements maintain such a relation that they are connected by a straight line in the nomographic chart of FIG. 2.

As indicated by the solid line in FIG. 2, it is assumed that rotational speed Nm1 of first MG 20 is Nm1(0), engine rotational speed Ne is Ne(0), and rotational speed Nm2 of second MG 30 is Nm2(0).

If rotation of engine 10 has stopped when the IG OFF operation is performed while vehicle 1 is traveling at high speed, vehicle 1 enters a state indicated by the broken line in FIG. 2. It is now assumed that engine 10 is started using first MG 20. In this case, it is necessary to increase engine rotational speed Ne to be higher than a lowest engine rotational speed at which first explosion can occur, by elevating rotational speed Nm1 of first MG 20 from Nm1(1) to Nm1(0).

It is thus necessary to generate torque in the positive rotational direction opposite to a rotational direction of first MG 20 (negative rotational direction). First MG 20, however, generates power in the process of elevating the rotational speed of first MG 20 from Nm1(1) to Nm1(0). Thus, if charging is restricted due to the SOC of battery 70 being higher than a normal SOC range, that is, if charge power upper limit value Win is lower than a case where the SOC is within the normal SOC range, first MG 20 may not be able to generate power. Therefore, the engine cannot in some cases be restarted immediately.

Accordingly, the present embodiment has a feature in that, when the stop command has been received at start switch 150 while vehicle 1 is traveling, ECU 200 prohibits restart of engine 10 while the speed of vehicle 1 is higher than a threshold value V(1), and permits restart of engine 10 after the speed of vehicle 1 becomes lower than threshold value V(1).

Figure 3:
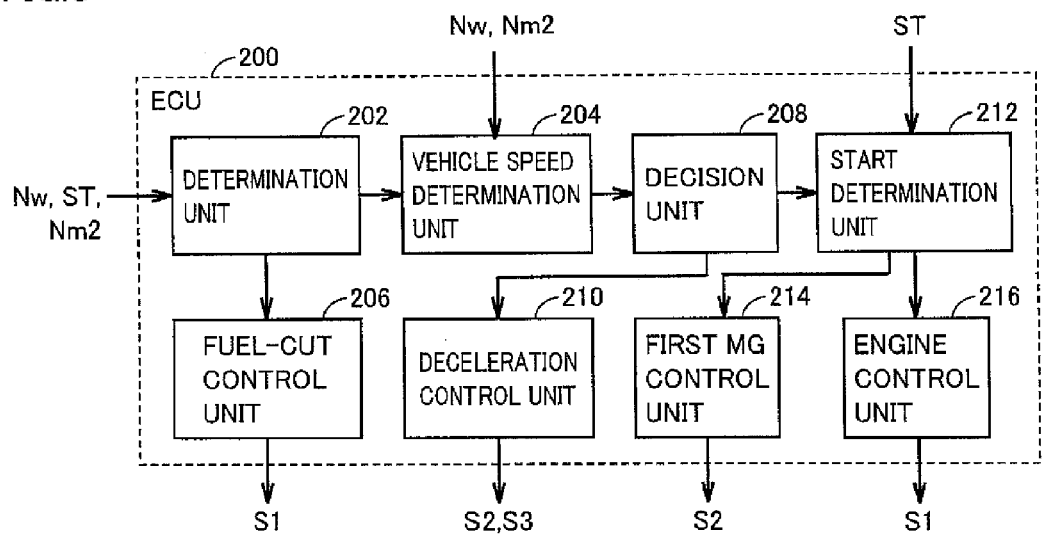
FIG. 3 is a functional block diagram of an ECU mounted on the vehicle according to the present embodiment.

FIG. 3 shows a functional block diagram of ECU 200 mounted on vehicle 1 according to the present embodiment. ECU 200 includes a determination unit 202, a vehicle speed determination unit 204, a fuel-cut control unit 206, a decision unit 208, a deceleration control unit 210, a start determination unit 212, a first MG control unit 214, and an engine control unit 216.

Determination unit 202 determines whether the IG OFF operation has been performed or not. Determination unit 202 determines that the IG OFF operation has been performed when signal ST has been received from start switch 150 while the system of vehicle 1 is in the start state. It is noted that determination unit 202 may, for example, turn an IG OFF determination flag on when the IG OFF operation has been performed.

Further, determination unit 202 determines whether vehicle 1 is traveling or not. Determination unit 202 determines that vehicle 1 is traveling when vehicle speed V is higher than a prescribed vehicle speed V(0). It is noted that determination unit 202 may turn a travel determination flag on when it is determined that vehicle 1 is traveling.

Vehicle speed determination unit 204 determines whether vehicle speed V is lower than threshold value V(1) or not. Threshold value V(1) is an upper limit value of the speed that allows restart of engine 10. Threshold value V(1) may be a predetermined value or may be a value set in accordance with a state of vehicle 1 (e.g., charge power upper limit value Win). It is noted that threshold value V(1) may be a value that is the same as or different from prescribed vehicle speed V(0) described above.

When both the IG OFF determination flag and the travel determination flag are in the ON state, vehicle speed determination unit 204 determines whether vehicle speed V is lower than threshold value V(1) or not. When determining that vehicle speed V is lower than threshold value V(1), vehicle speed determination unit 204 turns a vehicle speed determination flag on.

When determination unit 202 has determined that the IG OFF operation has been performed, and has also determined that vehicle 1 is traveling, fuel-cut control unit 206 executes fuel-cut control to stop fuel injection to cylinders 102. Fuel-cut control unit 206 generates control signal S1 indicating the execution of the fuel-cut control, and transmits generated control signal S1 to engine 10. It is noted that fuel-cut control unit 206 may execute the fuel-cut control when, for example, both the IG OFF determination flag and the travel determination flag are in the ON state.

When vehicle speed determination unit 204 has determined that vehicle speed V is lower than threshold value V(1), decision unit 208 decides permission of restart of engine 10. When vehicle speed determination unit 204 has determined that vehicle speed V is equal to or higher than threshold value V(1), decision unit 208 decides prohibition of restart of engine 10.

For example, decision unit 208 may turn a start permission flag on when vehicle speed determination unit 204 has determined that vehicle speed V is lower than threshold value V(1) (when the vehicle speed determination flag has been turned on), and may turn the start permission flag off when vehicle speed determination unit 204 has determined that vehicle speed V is equal to or higher than threshold value V(1).

When vehicle speed determination unit 204 has determined that vehicle speed V is equal to or higher than threshold value V(1), deceleration control unit 210 executes deceleration control for reducing the speed of vehicle 1.

Deceleration control unit 210 may, for example, control braking device 151 to reduce the speed of vehicle 1 using the frictional force, when vehicle speed determination unit 204 has determined that vehicle speed V is equal to or higher than threshold value V(1). Specifically, when vehicle speed determination unit 204 has determined that vehicle speed V is equal to or higher than threshold value V(1), deceleration control unit 210 controls brake actuator 152 such that the hydraulic pressure supplied to the wheel cylinder increases.

Alternatively, deceleration control unit 210 may, for example, control second MG 30 to generate motor torque in the negative rotational direction and reduce the speed of vehicle 1, when vehicle speed determination unit 204 has determined that vehicle speed V is equal to or higher than threshold value V(1). When vehicle 1 is decelerated using second MG 30, it is desirable to decelerate vehicle 1 by operating second MG 30 within a range of the allowable input power in battery 70 because power is generated through regenerative braking.

In a case where an automatic transmission is provided between the speed reducer and drive shaft 16, deceleration control unit 210 may control the automatic transmission to reduce the speed of vehicle 1 by increasing (changing to the low gear side) the gear ratio of the automatic transmission (the number of rotation of an output shaft of the automatic transmission/the number of rotation of an input shaft of the automatic transmission), when vehicle speed determination unit 204 has determined that vehicle speed V is equal to or higher than threshold value V(1).

For example, deceleration control unit 210 may execute the deceleration control when the vehicle speed determination flag (or the start permission flag) is off.

In addition, deceleration control unit 210 ends the deceleration control when vehicle speed determination unit 204 has determined that vehicle speed V has become lower than threshold value V(1).

When decision unit 208 has permitted restart of engine 10, start determination unit 212 determines whether there is a request for restart of engine 10 or not. When the IG ON operation has been performed by the driver after restart of engine 10 has been permitted, for example, start determination unit 212 determines that there is a request for restart of engine 10. For example, start determination unit 212 may determine whether there is a request for restart of engine 10 or not when the start permission flag is in the ON state, and may turn a restart request flag on when it has been determined that there is a request for restart of engine 10.

When start determination unit 212 has determined that there is a request for restart of engine 10, first MG control unit 214 causes first MG 20 to generate torque in the positive rotational direction and increases engine rotational speed Ne to a rotational speed that is necessary for start. The rotational speed that is necessary for start is not particularly limited as long as it is higher than the lowest rotational speed at which first explosion can occur, for example. First MG control unit 214 may control first MG 20 such that first MG 20 generates the torque in the positive rotational direction, when the restart request flag is on, for example. First MG control unit 214 generates control signal S2 for causing first MG 20 to generate the torque in the positive rotational direction, and transmits control signal S2 to PCU 60.

Engine control unit 216 ends the fuel-cut control and executes fuel injection control when engine rotational speed Ne has become higher than the rotational speed that is necessary for start, using the torque of first MG 20. By combustion of a mixture of fuel and air in cylinders 102, engine 10 is restarted. In the present embodiment, ignition control may be stopped along with the fuel-cut control and the ignition control may be resumed along with resuming of the fuel injection control, or the ignition control may be continued until vehicle 1 stops.

Although determination unit 202, vehicle speed determination unit 204, fuel-cut control unit 206, decision unit 208, deceleration control unit 210, start determination unit 212, first MG control unit 214, and engine control unit 216 are described in the present embodiment as realized through execution of a program stored in a memory by a CPU of ECU 200 and as functioning as software, they may be realized by hardware. It is noted that such a program is recorded in a storage medium for installation in the vehicle.

Figure 4:
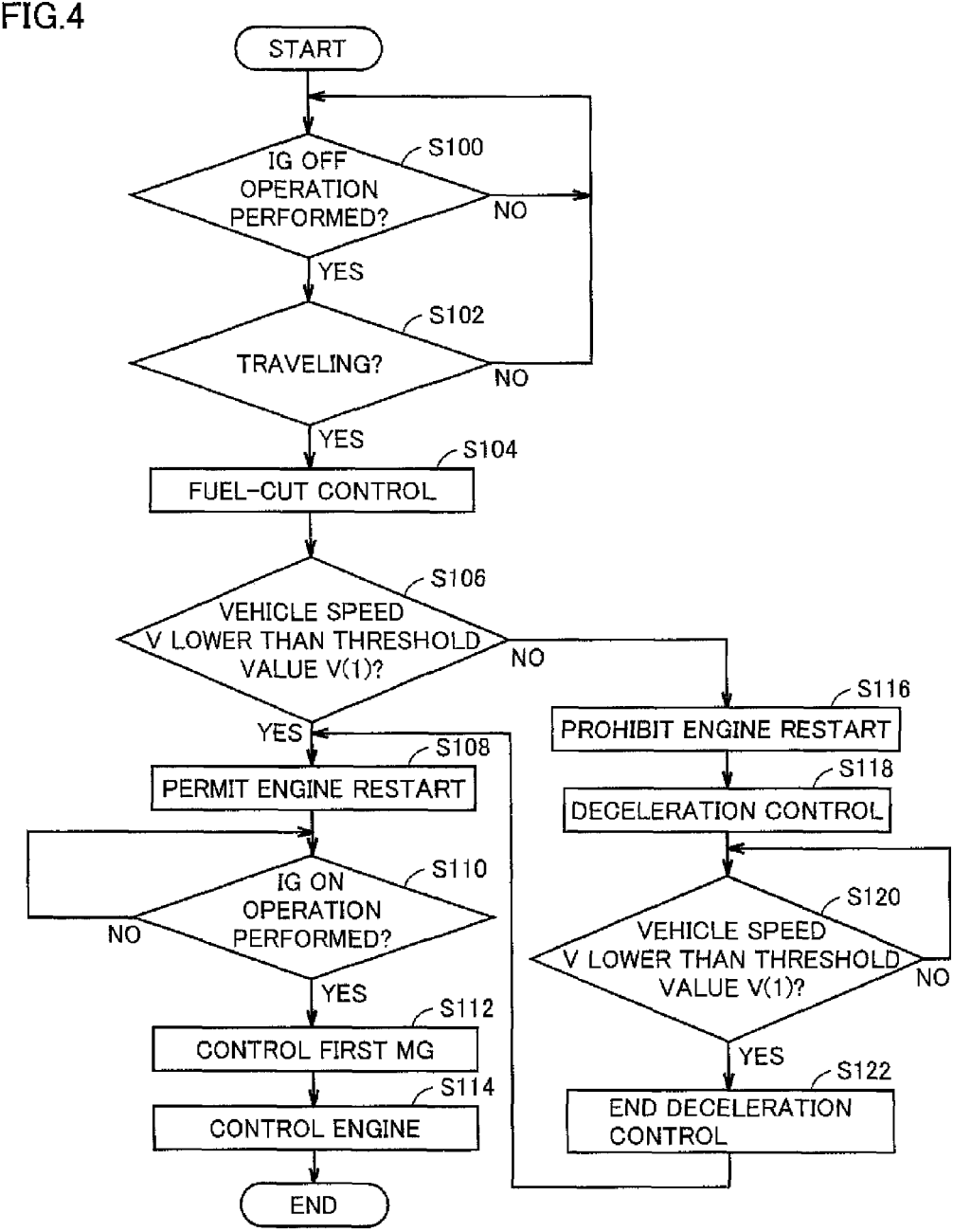
FIG. 4 is a flowchart of a program executed by the ECU mounted on the vehicle according to the present embodiment.

Referring to FIG. 4, a control structure of a program executed by ECU 200 mounted on vehicle 1 according to the present embodiment will be described.

In step ("step" will hereinafter be denoted as "S") 100, ECU 200 determines whether the IG OFF operation has been performed or not. If the IG OFF operation has been performed (YES in S100), the process is transferred to S102. If not (NO in S100), the process is returned to S100.

In S102, ECU 200 determines whether vehicle 1 is traveling or not. ECU 200 determines that vehicle 1 is traveling when vehicle speed V of vehicle 1 is higher than prescribed vehicle speed V(0). If vehicle 1 is traveling (YES in S102), the process is transferred to S104. If not (NO in S102), the process is returned to S100.

In S104, ECU 200 executes the fuel-cut control. In S106, ECU 200 determines whether vehicle speed V is lower than threshold value V(1) or not. If vehicle speed V is lower than threshold value V(1) (YES in S106), the process is transferred to S108. If not (NO in S106), the process is transferred to S116.

In S108, ECU 200 permits restart of engine 10. In S110, ECU 200 determines whether the IG ON operation has been performed or not. If the IG ON operation has been performed (YES in S110), the process is transferred to S112. If not (NO in S110), the process is returned to S110.

In S112, ECU 200 controls first MG 20 to increase engine rotational speed Ne to the rotational speed that is necessary for start. Since the contents of control over first MG 20 have been described above, detailed description thereof will not be repeated.

In S114, ECU 200 controls engine 10 to execute the fuel injection control when engine rotational speed Ne has become higher than the rotational speed that is necessary for start, using the torque of first MG 20.

In S116, ECU 200 prohibits restart of the engine. In S118, ECU 200 executes the deceleration control for reducing the speed of vehicle 1. Since the contents of the deceleration control have been described above, detailed description thereof will not be repeated.

In S120, ECU 200 determines whether vehicle speed V is lower than threshold value V(1) or not. If vehicle speed V is lower than threshold value V(1) (YES in S120), the process is transferred to S122. If not (NO in S110), the process is returned to S120. In S122, ECU 200 ends the deceleration control and the process is transferred to S108.

Operation of ECU 200 mounted on vehicle 1 according to the present embodiment based on the foregoing structure and flowchart will now be described with reference to the nomographic chart of FIG. 5. Since the element denoted by each axis in the nomographic chart is the same as that in the nomographic chart of FIG. 2, detailed description thereof will not be repeated.

Figure 5:
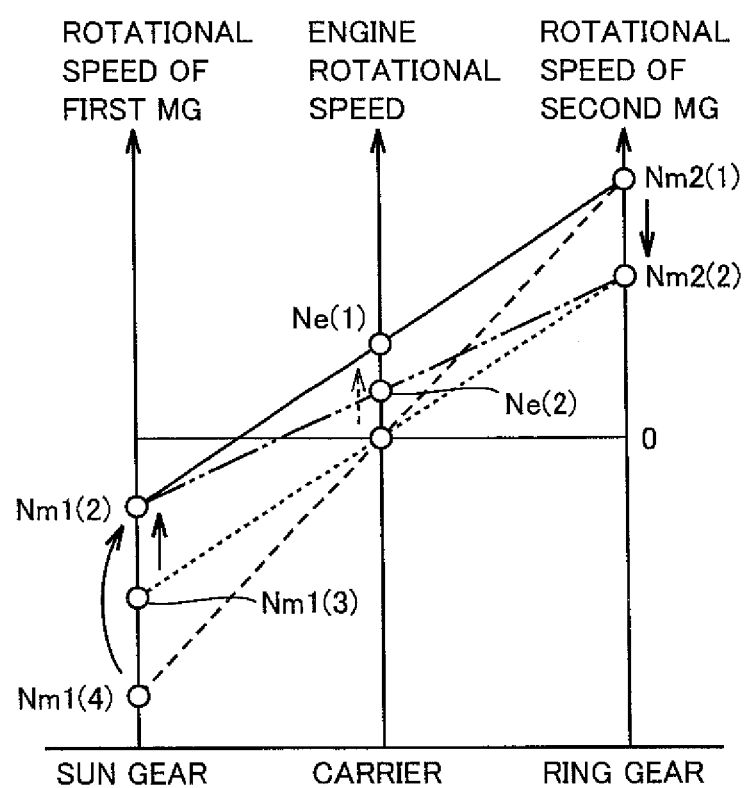
FIG. 5 is a (second) nomographic chart for illustrating operation of the vehicle in the present embodiment.

As indicated by the solid line in FIG. 5, it is assumed that rotational speed Nm1 of first MG 20 is Nm1(2), engine rotational speed Ne is Ne(1), and rotational speed Nm2 of second MG 30 is Nm2(1).

If the IG OFF operation is performed while vehicle 1 is traveling (YES in S100 and YES in S102), the fuel-cut control is executed (S104). If vehicle speed V is equal to or higher than threshold value V(1) (NO in S106), restart of the engine is prohibited (S116) and the deceleration control is executed (S118). Due to the execution of the deceleration control such as, for example, operation of braking device 151, regenerative braking of second MG 30 or control over the automatic transmission, vehicle speed V decreases with the passage of time. Consequently, as indicated by the two-dot chain line in FIG. 5, rotational speed Nm2 of second MG 30 changes from Nm2(1) to Nm2(2).

If vehicle speed V becomes lower than threshold value V(1) (YES in S120), the deceleration control ends (S122) and restart of engine 10 is permitted (S108). On the other hand, due to the execution of the fuel-cut control, rotational speed Ne of engine 10 decreases with the passage of time. Consequently, as indicated by the thin broken line in FIG. 5, rotational speed Ne becomes zero. At this time, rotational speed Nm1 of first MG 20 becomes Nm1(3).

If the IG ON operation is performed by the driver in this state (YES in S110), first MG 20 is controlled to cause first MG 20 to generate the torque in the positive rotational direction (S112). As a result of the generation of the torque in the positive rotational direction in first MG 20, rotational speed Nm1 of first MG 20 increases in the positive rotational direction. As a result of the increase in rotational speed Nm1 of first MG 20 in the positive rotational direction, rotational speed Nm1 of first MG 20, engine rotational speed Ne and rotational speed Nm1 of second MG 30 change from a state indicated by the thin broken line in FIG. 5 toward a state indicated by the two-dot chain line in FIG. 5 in the nomographic chart shown in FIG. 5. In other words, engine rotational speed Ne increases. If engine rotational speed Ne becomes higher than the rotational speed that is necessary for start, the fuel injection control is executed (S114) and engine 10 is restarted.

As described above, with the vehicle according to the present embodiment, when the stop command has been received at start switch 150 while vehicle 1 is traveling, restart of engine 10 is prohibited while vehicle speed V is higher than threshold value V(1). As a result, power generation by first MG 20 when the engine is started in response to the IG ON operation can be suppressed. In addition, restart of engine 10 is permitted after vehicle speed V becomes lower than threshold value V(1). As a result, an amount of increase in rotational speed Nm1 of first MG 20 when increasing engine rotational speed Ne at the time of restart of engine 10 can be made smaller than that when vehicle speed V is equal to or higher than threshold value V(1). Therefore, an amount of power generated by first MG 20 at the time of restart of engine 10 can be made smaller than that when vehicle speed V does not become lower than threshold value V(1). In other words, first MG 20 can be operated within the range of the allowable input power in battery 70. Consequently, engine 10 can be restarted immediately. Thus, there can be provided a vehicle and a control method for a vehicle wherein an engine is controlled to be in a restartable state when a stop command for the engine has been received during high-speed traveling. In addition, charging of battery 70 over the allowable input power can be avoided. Thus, deterioration of battery 70 can be prevented.

Furthermore, while ECU 200 has been described as being a single ECU in FIG. 1, two or more ECUs may be used. For example, the operation of ECU 200 in FIG. 1 may be shared by an engine ECU for controlling engine 10 and a hybrid ECU for controlling PCU 60.

Furthermore, in the configuration of vehicle 1 according to the present embodiment, when engine 10 is started from a rotation stop state of engine 10 while vehicle 1 is traveling, first MG 20 generates power. Now, assume a case where the motor generator for starting engine 10 is discharged. In this case as well, when the stop command has been received at start switch 150 during traveling, restart of engine 10 is prohibited while vehicle speed V is higher than threshold value V(1), and restart of engine 10 is permitted after vehicle speed V becomes lower than threshold value V(1). Therefore, an amount of discharge in first MG 20 when increasing engine rotational speed Ne at the time of restart of engine 10 can be made smaller than that when vehicle speed V is equal to or higher than threshold value V(1). In other words, first MG 20 can be operated within a range of the allowable output power in battery 70. Consequently, engine 10 can be restarted immediately.

While FIG. 1 shows vehicle 1 having drive wheels 80 as front wheels by way of example, the present invention is not particularly limited to such a drive system. For example, vehicle 1 may have the drive wheels as rear wheels. Alternatively, vehicle 1 may be a vehicle in which second MG 30 in FIG. 1 is omitted. Still alternatively, vehicle 1 may be a vehicle in which second MG 30 in FIG. 1 is coupled to a drive shaft for driving the rear wheels, instead of being coupled to drive shaft 16 of the front wheels. Moreover, a shifting mechanism may be provided between drive shaft 16 and speed reducer 58 or between drive shaft 16 and second MG 30.

Figure 6:
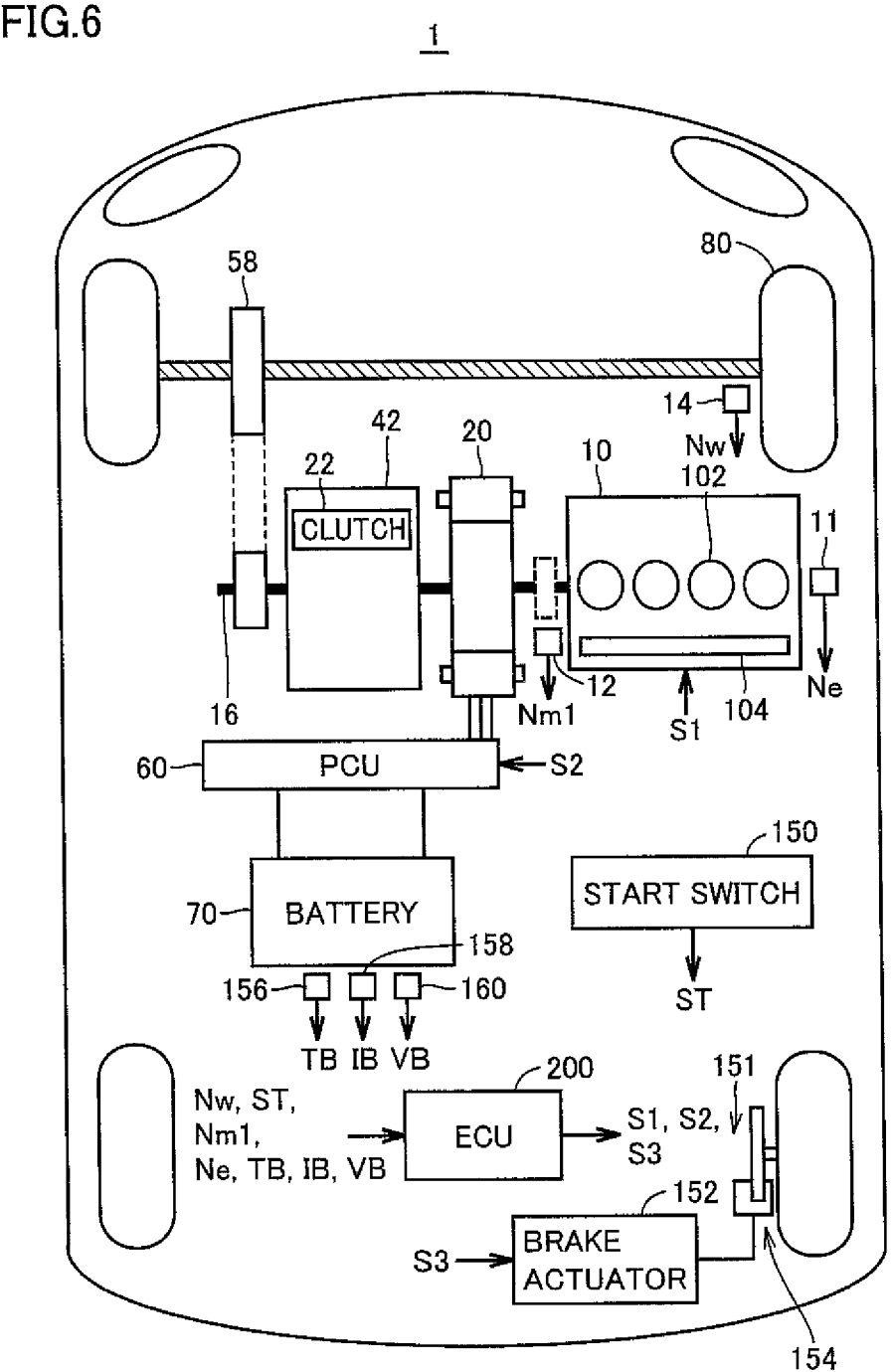
FIG. 6 is a diagram showing another configuration example of the vehicle.

Alternatively, vehicle 1 may have a configuration shown in FIG. 6. Specifically, vehicle 1 shown in FIG. 6 differs from the configuration of vehicle 1 shown in FIG. 1 in that second MG 30 is not included, in that the rotation shaft of first MG 20 is directly coupled to the output shaft of engine 10, and in that a power transmission device 42 having a clutch 22 is included instead of power split device 40. Clutch 22 changes first MG 20 and drive wheels 80 between a power transmission state and a power interruption state. Power transmission device 42 is, for example, a shifting mechanism. It is noted that in addition to clutch 22, a clutch (broken line in FIG. 6) may be further provided between engine 10 and first MG 20.

Such vehicle 1 may be configured such that, when the stop command has been received at start switch 150 while vehicle 1 is traveling, restart of engine 10 is prohibited while vehicle speed V is higher than threshold value V(1), and restart of engine 10 is permitted after vehicle speed V becomes lower than threshold value V(1).

For example, when control for switching clutch 22 from a disengaged state to an engaged state is executed, with the rotational speed of engine 10 in the stop state being synchronized with the rotational speed of drive wheels 80 using first MG 20, and thereafter, fuel injection is resumed and engine 10 is started while vehicle 1 is traveling, the amount of increase in the rotational speed of first MG 20 increases as the vehicle speed becomes higher. Therefore, the amount of discharge in first MG 20 increases.

Therefore, by permitting restart of engine 10 when the stop command has been received at start switch 150 while vehicle 1 is traveling, and after vehicle speed V becomes lower than threshold value V(1), first MG 20 can be operated within the range of the allowable output power in battery 70. Consequently, after vehicle speed V becomes lower than threshold value V(1), engine 10 can be restarted immediately in response to the request for restart.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle; 10 engine; 11 engine rotational speed sensor; 12 first resolver; 13 second resolver; 14 wheel speed sensor; 16 drive shaft; 20 first MG; 30 second MG; 40 power split device; 50 sun gear; 52 pinion gear; 54 carrier; 56 ring gear; 58 speed reducer; 70 battery; 80 drive wheel; 102 cylinder; 104 fuel injection device; 150 start switch; 151 braking device; 152 brake actuator; 154 disc brake; 156 battery temperature sensor; 158 current sensor; 160 voltage sensor; 200

ECU; 202 determination unit; 204 vehicle speed determination unit; 206 fuel-cut control unit; 208 decision unit; 210 deceleration control unit; 212 start determination unit; 214 first MG control unit; 216 engine control unit.

The invention claimed is:

1. A vehicle, comprising:
a drive wheel;
an internal combustion engine;
a first rotating electric machine for starting said internal combustion engine;
a power transmission device coupled between said first rotating electric machine and said drive wheel;
an input unit for receiving, from a driver, either a stop command or a start command for a system of a vehicle; and
a control unit for controlling said vehicle in accordance with a command from said input unit, wherein
when said stop command has been received at said input unit while said vehicle is traveling, said control unit stops a fuel injection, and
when said start command has been received at said input unit, said internal combustion engine is not restarted with resuming said fuel injection by said control unit while a speed of said vehicle is higher than a threshold value, and is restarted by said control unit after the speed of said vehicle becomes lower than said threshold value.

2. The vehicle according to claim 1, further comprising:
a power storage device for transmitting and receiving power to and from said first rotating electric machine, wherein
said first rotating electric machine generates power when said internal combustion engine in a stop state is started while said vehicle is traveling.

3. The vehicle according to claim 1, further comprising:
a braking device for restricting rotation of said drive wheel using frictional force, wherein
when said stop command has been received at said input unit while said vehicle is traveling, said control unit controls said braking device to reduce the speed of said vehicle using said frictional force.

4. The vehicle according to claim 1, wherein
said power transmission device includes an automatic transmission, and
when said stop command has been received at said input unit while said vehicle is traveling, said control unit controls said automatic transmission to reduce the speed of said vehicle by increasing a gear ratio of said automatic transmission.

5. The vehicle according to claim 1, further comprising:
a second rotating electric machine for restricting rotation of said drive wheel using motor torque, wherein
when said stop command has been received at said input unit while said vehicle is traveling, said control unit controls said second rotating electric machine to reduce the speed of said vehicle using said motor torque.

6. The vehicle according to claim 1, further comprising:
a drive shaft for rotating said drive wheel, wherein
said power transmission device mechanically couples three elements, which are said drive shaft, an output shaft of said internal combustion engine, and a rotation shaft of said first rotating electric machine, and utilizes any one of said three elements as a reaction force element, thereby allowing for transmission of motive power between the other two elements.

7. The vehicle according to claim 1, wherein
said power transmission device includes a clutch for switching a state of said first rotating electric machine and said drive wheel between a power transmission state and a power interruption state.

8. A control method for a vehicle used in a vehicle including a drive wheel, an internal combustion engine, a first rotating electric machine for starting said internal combustion engine, and a power transmission device coupled between said first rotating electric machine and said drive wheel, the control method comprising the steps of:
determining whether either a stop command or a start command for a system of the vehicle has been received from a driver or not;
when said stop command has been received while said vehicle is traveling, stopping a fuel injection; and
when said start command has been received, not restarting said internal combustion engine with resuming the fuel injection while a speed of said vehicle is higher than a threshold value, and restarting said internal combustion engine after the speed of said vehicle becomes lower than said threshold value.

* * * * *